(12) United States Patent
Raghu et al.

(10) Patent No.: US 10,007,311 B2
(45) Date of Patent: Jun. 26, 2018

(54) ADAPTIVE TEMPERATURE AND MEMORY PARAMETER THROTTLING

(71) Applicant: SanDisk Technologies LLC, Plano, TX (US)

(72) Inventors: Deepak Raghu, San Jose, CA (US);
Pao-Ling Koh, Fremont, CA (US);
Philip Reusswig, Mountain View, CA (US); Chris Nga Yee Yip, Sunnyvale, CA (US); Jun Wan, San Jose, CA (US); Yan Li, Milpitas, CA (US)

(73) Assignee: SanDisk Technologies LLC, Plano, TX (US)

( * ) Notice: Subject to any disclaimer, the term of this patent is extended or adjusted under 35 U.S.C. 154(b) by 0 days. days.

(21) Appl. No.: 15/237,139

(22) Filed: Aug. 15, 2016

(65) Prior Publication Data

US 2018/0046231 A1     Feb. 15, 2018

(51) Int. Cl.
| | |
|---|---|
| *G11C 7/04* | (2006.01) |
| *G06F 1/20* | (2006.01) |
| *G06F 3/06* | (2006.01) |

(52) U.S. Cl.
CPC ............ *G06F 1/206* (2013.01); *G06F 3/0616* (2013.01); *G06F 3/0653* (2013.01); *G06F 3/0688* (2013.01)

(58) Field of Classification Search
CPC .................................. G11C 7/04; G11C 29/00

USPC .............................................. 365/211, 185.11
See application file for complete search history.

(56) References Cited

U.S. PATENT DOCUMENTS

| | | | |
|---|---|---|---|
| 9,753,657 B2 | 9/2017 | Yang et al. | |
| 2007/0114959 A1* | 5/2007 | Echazarreta | H02P 7/04 318/268 |
| 2010/0110815 A1* | 5/2010 | Lee | G11C 5/143 365/211 |
| 2011/0219203 A1* | 9/2011 | Nurminen | G11C 7/04 711/165 |
| 2012/0265473 A1* | 10/2012 | Arisaka | G01K 7/01 702/99 |
| 2016/0180946 A1* | 6/2016 | Hong | G11C 16/26 365/185.11 |
| 2017/0083249 A1 | 3/2017 | Yang et al. | |
| 2017/0300263 A1 | 10/2017 | Helmick | |

\* cited by examiner

*Primary Examiner* — Han Yang
(74) *Attorney, Agent, or Firm* — Brinks Gilson & Lione

(57) ABSTRACT

A storage device with a memory may modify throttling to reduce cross temperature effects. The decision to throttle may be based on a memory device temperature (i.e. temperature throttling) or may be based on the memory device's health, usage, or performance (e.g. hot count or bit error rate). Temperature throttling may be implemented that considers the memory device's health, usage, or performance (e.g. hot count or bit error rate). Likewise, throttling based on the memory device's health, usage, or performance may utilize the memory device's temperature to optimize throttling time. For example, a test mode matrix (TMM) may be modified to depend on temperature.

14 Claims, 11 Drawing Sheets

ADAPTIVE TEMPERATURE AND MEMORY PARAMETER THROTTLING

TECHNICAL FIELD

This application relates generally to the impact of temperature on memory devices. More specifically, this application relates to adjusting temperature throttling based on usage, health, or age of the memory device and adjusting memory parameters based on temperature.

BACKGROUND

Non-volatile memory systems, such as flash memory, have been widely adopted for use in consumer products. Flash memory may be found in different forms, for example in the form of a portable memory card that can be carried between host devices or as a solid state disk ("SSD") embedded in a host device. One consideration for the endurance and reliability of such memory is cross temperature. Cross temperature (i.e. X-temp) may be a temperature range or temperature swing between data programming and reading. For example, a high X-temp may be caused when data is written to a memory device at a high temperature (hot), but then read at a low temperature (cold). Likewise, writing at a cold temperature and reading at a hot temperature is a high cross temperature. For memory devices (e.g. NAND flash memory) X-temp may be a limiting reliability mechanism. High X-temp may result in errors. In particular, the X-temp bit error rate (BER) increases with a larger X-temp delta. Memory endurance and performance may be improved by addressing X-temp.

SUMMARY

A storage device with a memory may modify throttling to reduce cross temperature effects. The decision to throttle may be based on a memory device temperature (i.e. temperature throttling) or may be based on the memory device's health, usage, or performance (e.g. hot count or bit error rate). Temperature throttling may be implemented that considers the memory device's health, usage, or performance (e.g. hot count or bit error rate). Likewise, throttling based on the memory device's health, usage, or performance may utilize the memory device's temperature to optimize throttling time. For example, a test mode matrix (TMM) may be modified to depend on temperature.

DESCRIPTION OF THE EMBODIMENTS

Figure 1A:
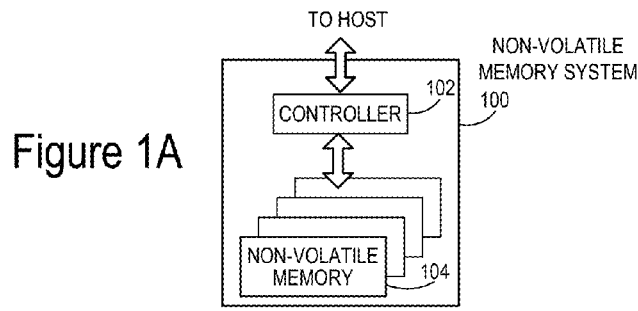
FIG. 1A is a block diagram of an example non-volatile memory system.

There may be customer requirements that result in throttling being necessary. At the beginning of life ("BOL"), there may be variations in devices and throttling may be used to remove the variance in performance. Likewise, there may be customer requirements on quality of service that can also be addressed through throttling. Throttling may also be used to control the bandwidth. The rate of heat generation in a high temperature environment can also be addressed through throttling. Temperature throttling may occur based on temperature detection (e.g. a hot environment) to prevent overheating. This throttling may be referred to as thermal throttling, which covers throttling to control heat generation. Conversely, power throttling may refer to controlling power.

Throttling may be used to address X-temp. The memory may be throttled for various reasons, including to limit power consumption, monitor/control temperature, extend the memory endurance, or achieve more consistent memory performance. Accordingly, performance variations, high temperatures, or power overages may be a reason to throttle. As described below, throttling may include modifications to a number of memory parameters, such as the parameters discussed in FIG. 8. The decision to throttle may be based on a memory device temperature (i.e. temperature throttling) or may be based on the memory device's health, usage, or performance (e.g. hot count or bit error rate). As described below, temperature throttling may be consider the memory device's health, usage, or performance when establishing a temperature throttling threshold, while throttling based on the memory device's health, usage, or performance may utilize the memory device's temperature to optimize throttling time.

Temperature throttling may be used to limit hot temperatures. High temperatures in a memory device may be a cause of errors. Accordingly, when a temperature reaches a certain threshold, the operation of the memory device may be throttled in an attempt to reduce the device temperature. The throttling that may be used is further described in FIG. 8. Temperature throttling may be a firmware initiated behavior where memory device performance is reduced when a maximum allowable system temperature is reached. The reduction in performance may ensure the memory does not exceed some maximum acceptable temperature (temperature threshold) by the system. When a throttling threshold is consistent throughout the life of the memory device, it may be inefficient early in life (when the threshold could be higher), while also potentially being less accurate later in life (when the threshold should be lower). Because throttling may include reducing a memory device's performance, the throttling should be reduced as much as possible to maximize performance. A consideration of memory device health or usage may provide a more accurate temperature throttling threshold.

Likewise, modifying test parameters (e.g. in a test mode matrix (TMM) discussed below) for memory device health by considering temperature may also allow for reduced throttling. By making the TMM temperature dependent, the temperature cross range may be expanded without reliability concerns. A test mode matrix (TMM) may be used for establishing throttling of certain memory parameters to prevent errors or reduce the bit error rate (BER). TMM may rely on the health or endurance of the memory. For example, TMM may be based on a hot count (e.g. program/erase PE cycles) or the BER. When the hot count or BER exceeds a threshold, certain memory parameters may be throttled to reduce future errors. The throttling that may be used is further described in FIG. 8. The TMM can be modified to be temperature dependent. In particular, TMM may be used to protect against data reliability problems due to temperature cross. By making the TMM temperature dependent, the temperature cross range may be expanded without reliability concerns.

FIGS. 1A-2B are exemplary memory systems which may implement the adaptive throttling described herein. FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104. The non-volatile memory die 104 may store an operating system for the host.

Examples of host systems include, but are not limited to, personal computers (PCs), such as desktop or laptop and other portable computers, datacenter server, tablets, mobile devices, cellular telephones, smartphones, personal digital assistants (PDAs), gaming devices, digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Serial AT Attachment (SATA) protocol, Serial Attached SCSI (SAS) protocol, Nonvolatile Memory express (NVMe) protocol, Secure Digital (SD) protocol, Memory Stick (MS) protocol and Universal Serial Bus (USB) protocol.

The controller 102 (which may be a flash memory controller or device controller) can take the form of processing circuitry, a microprocessor or processor, and a computer-readable medium that stores computer-readable program code (e.g., software or firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including but not limited to NAND flash memory cells, NOR flash memory cells, Phase Change Memory (PCM), Resistive RAM (ReRam), or Magnetoresistive Random Access Memory (MRAM). The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be part of an embedded memory system. For example, the flash memory may be embedded within the host, such as in the form of a solid state disk (SSD) drive installed in a personal computer. In another embodiment, memory system 100 may be a card based system, such as a secure digital (SD) or a micro secure digital (micro-SD) card.

Although in the example illustrated in FIG. 1A, non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
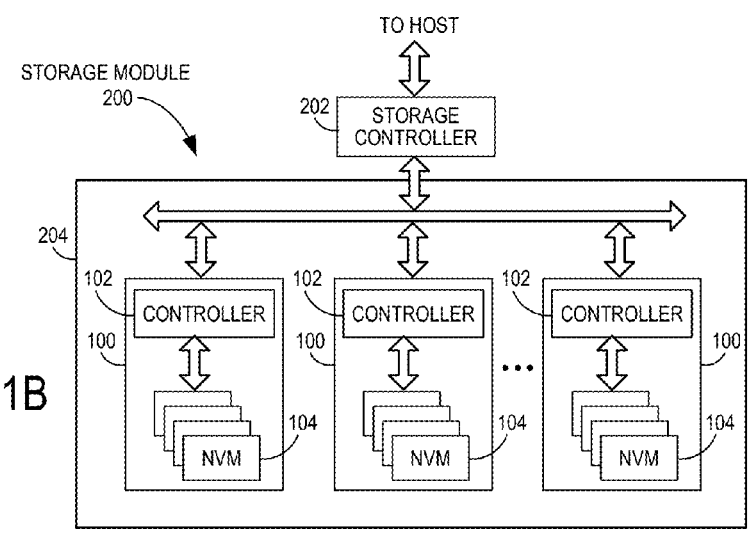
FIG. 1B is a block diagram of a storage module that includes a plurality of non-volatile memory systems.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
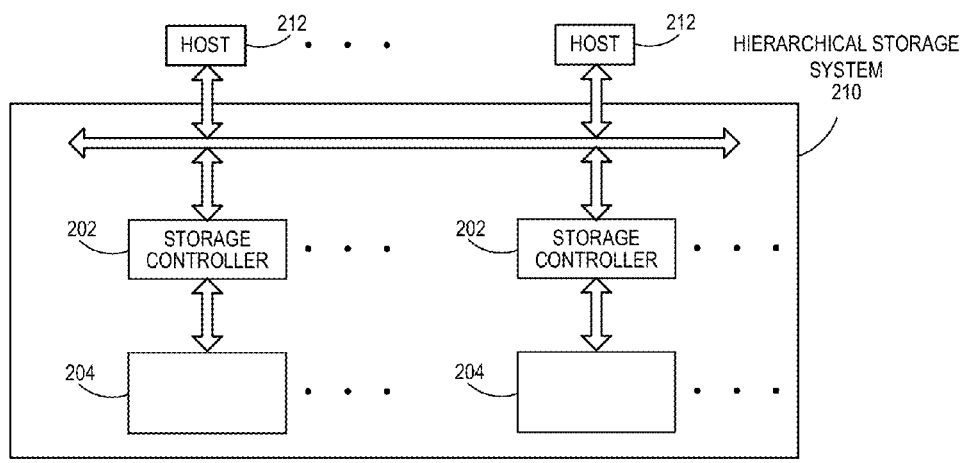
FIG. 1C is a block diagram of a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
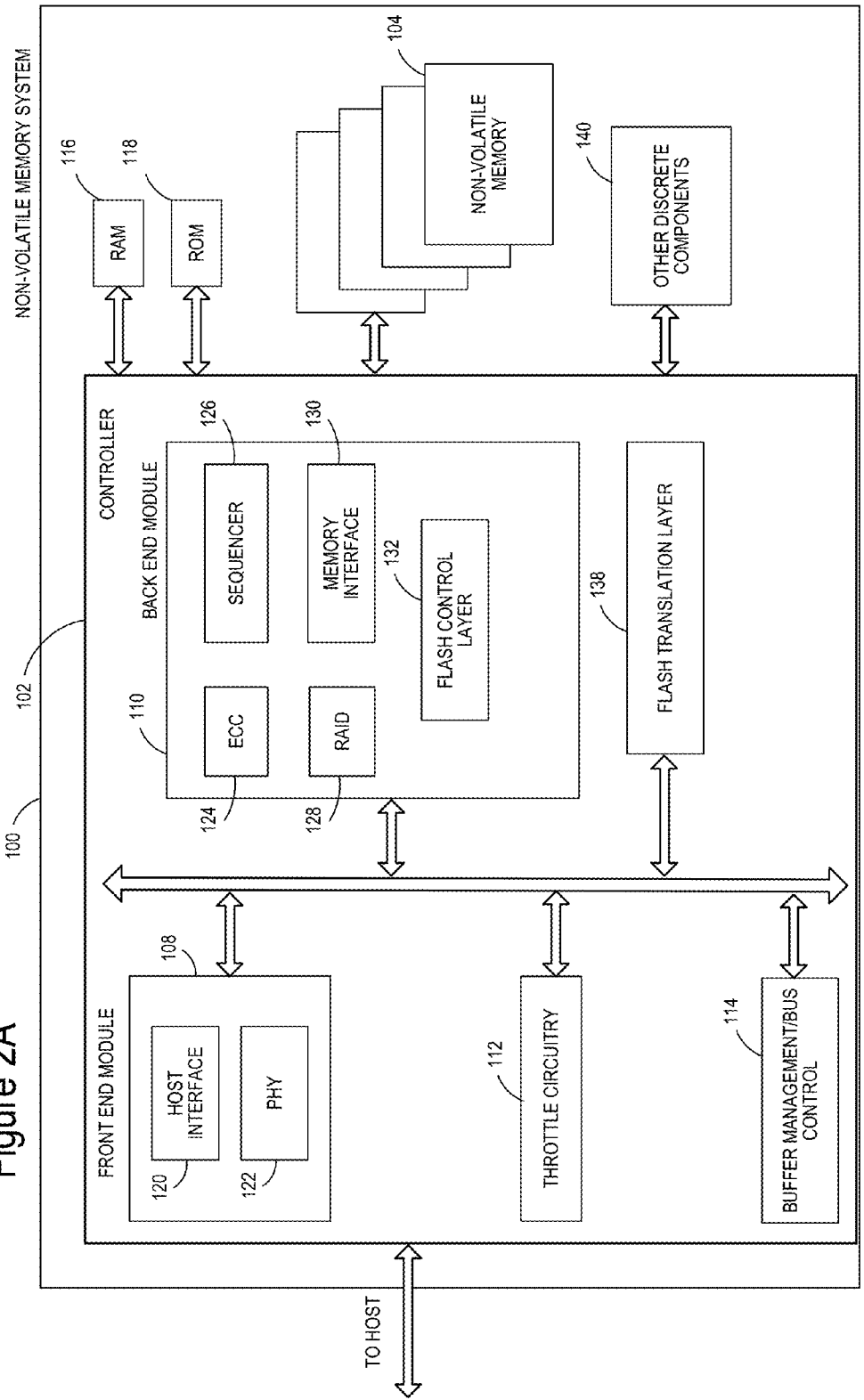
FIG. 2A is a block diagram of exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. The back end module 110 may include the queue manager 306 and/or the flash translation layer 138 as shown in and described with respect to FIG. 3.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 104, for example, that comprises instructions executable with a processor to implement one or more of the features of the module. When any one of the modules includes the portion of the memory that comprises instructions executable with the processor, the module may or may not include the processor. In some examples, each module may just be the portion of the memory 104 or other physical memory that comprises instructions executable with the processor to implement the features of the corresponding module.

Figure 5:
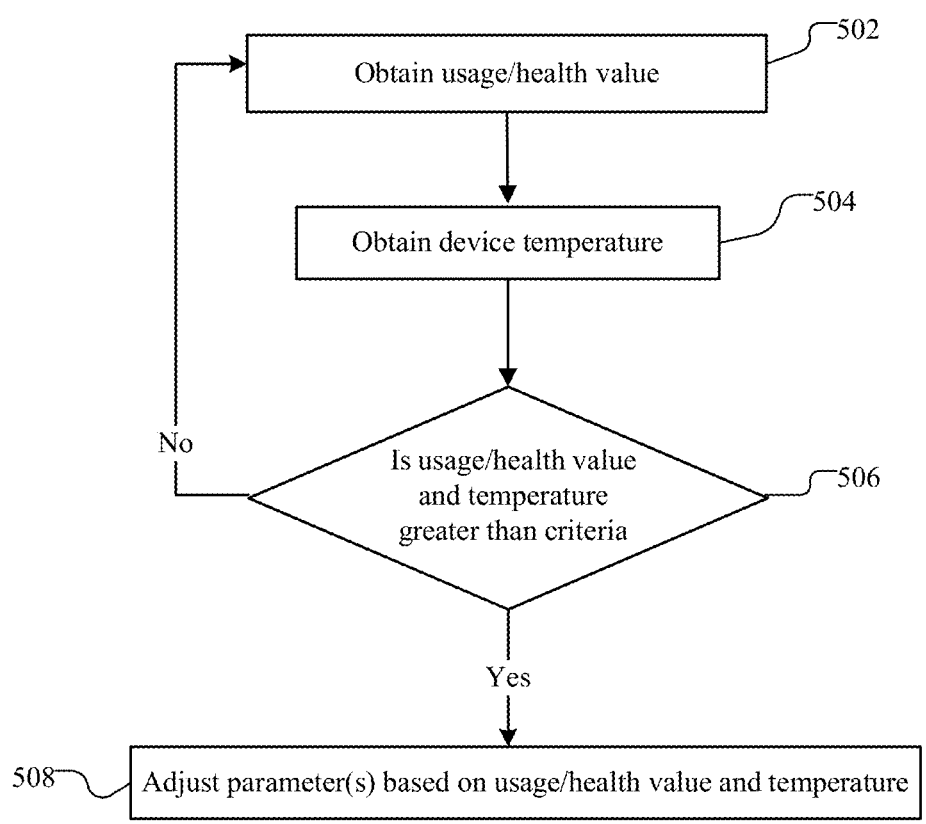
FIG. 5 is a flow chart for modifying throttling based on memory health/usage and temperature.
Figure 6:
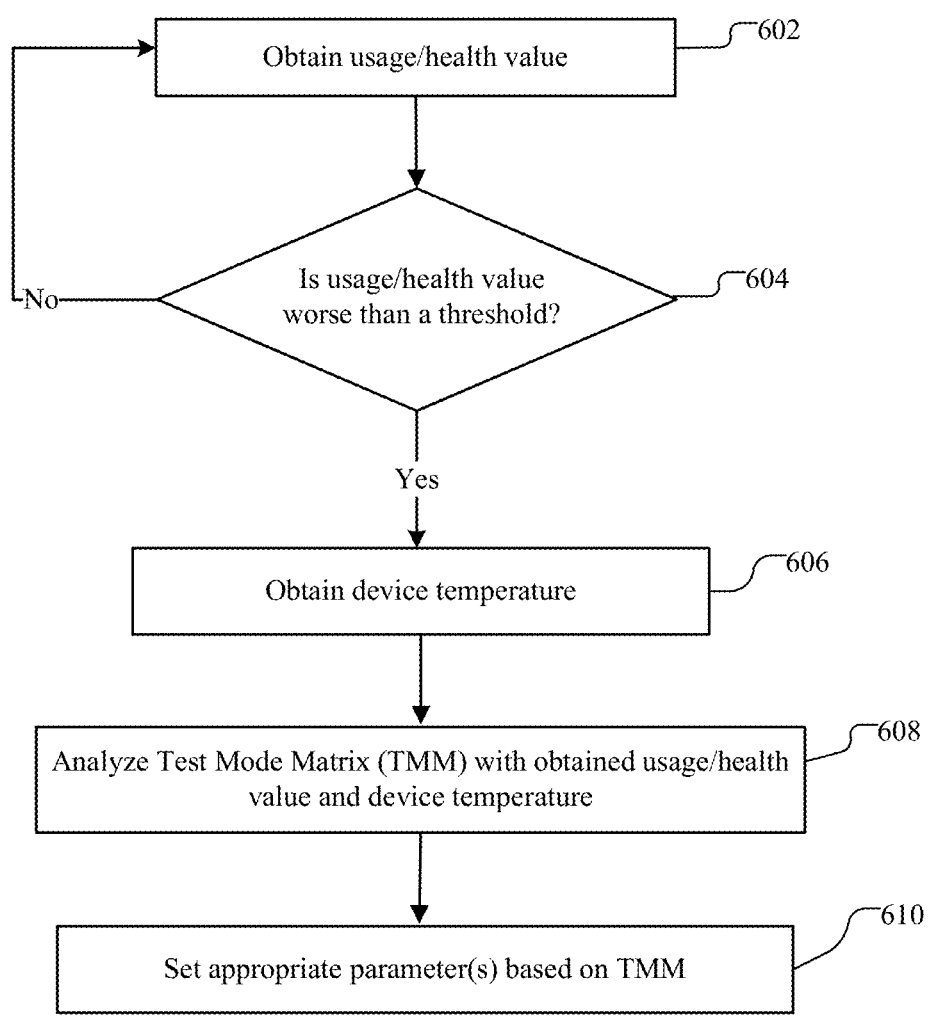
FIG. 6 is a flow chart for modifying a test mode matrix (TMM) based on temperature.
Figure 7:
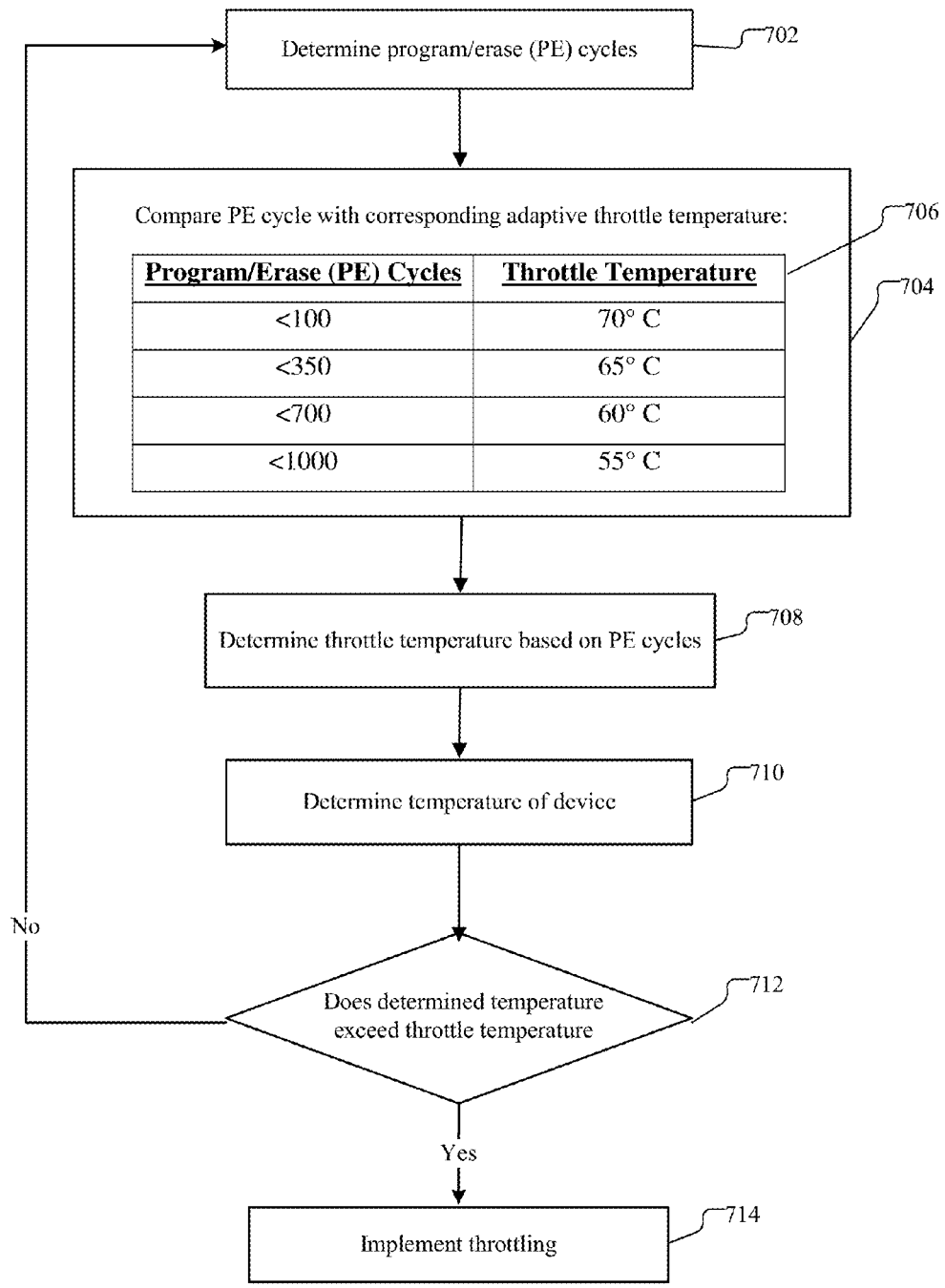
FIG. 7 is a flow chart of a temperature throttling threshold that is dependent on memory health/usage.
Figure 8:
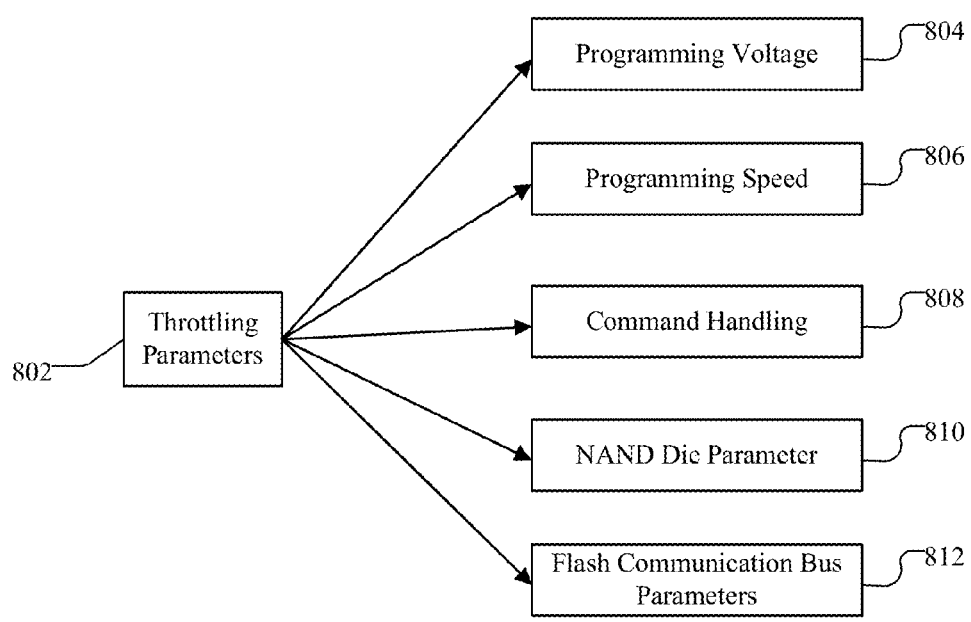
FIG. 8 is a diagram illustrating exemplary throttling parameters.

The controller 102 may include throttle circuitry 112. The throttle circuitry 112 may determine when the memory is in a throttle mode and modify parameters for the throttle mode. The throttle circuitry 112 may be coupled with or part of the flash translation layer 138. Exemplary throttle mechanisms are illustrated in FIG. 8. FIGS. 5-7 illustrate exemplary embodiments in which the throttling can be modified in the temperature context. In particular, the throttle circuitry 112 may modify the temperature throttling threshold based on memory health/endurance/usage or modify the TMM throttling to be dependent on temperature as further discussed below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include flash translation layer ("FTL") 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, and buffer management/bus controller 114 are optional components that are not necessary in the controller 102.

The FTL 138 may also be referred to as a Media Management Layer ("MML"). The FTL 138 may be integrated as part of the flash management or flash control layer 132 that may handle flash errors and interfacing with the host. In particular, FTL may be circuitry responsible for the internals of NAND management. In particular, the FTL 138 may include functionality or an algorithm in the memory device firmware which translates reads/writes from the host into reads/writes to the flash memory 104. The FTL 138 may receive commands (or access a queue of commands) for execution (e.g. programming to the non-volatile memory 104 or reading from the non-volatile memory 104). By accessing a queue of the commands, the FTL 138 can optimally and efficiently select when and how to execute commands from the queue. In one example, the FTL 138 may group commands to increase the efficiency with which the non-volatile memory 104 is accessed. In one example, the FTL 138 may select commands to extend the endurance and lifetime of the non-volatile memory 104.

Figure 2B:
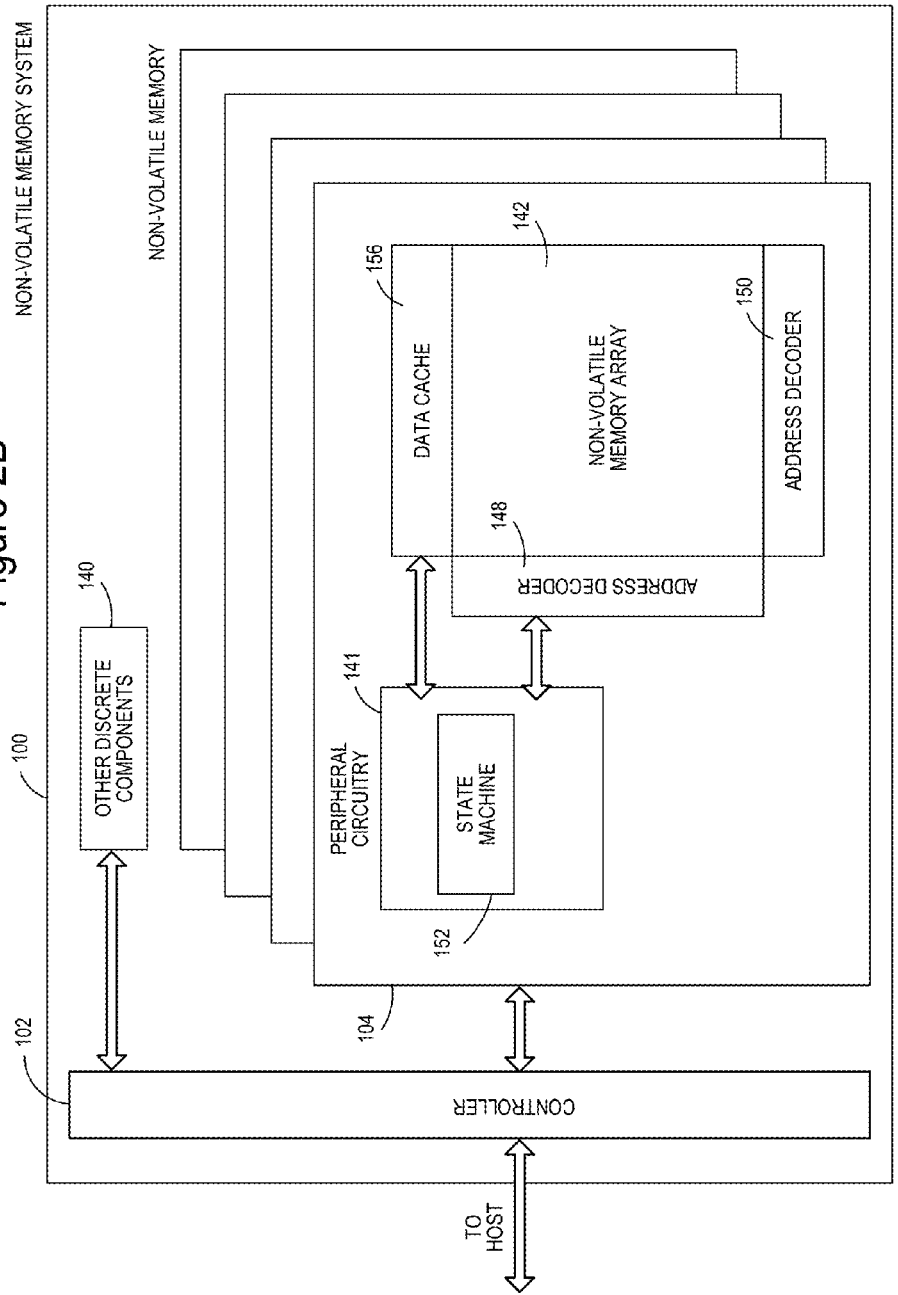
FIG. 2B is a block diagram of exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data and may be arranged in planes. In one embodiment, each non-volatile memory die 104 may include one or more planes. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data. Exemplary peripheral circuitry 141 may include clocks, pumps, ESD, current shunt, current sink, and/or closely-packed logic circuits.

Figure 3:
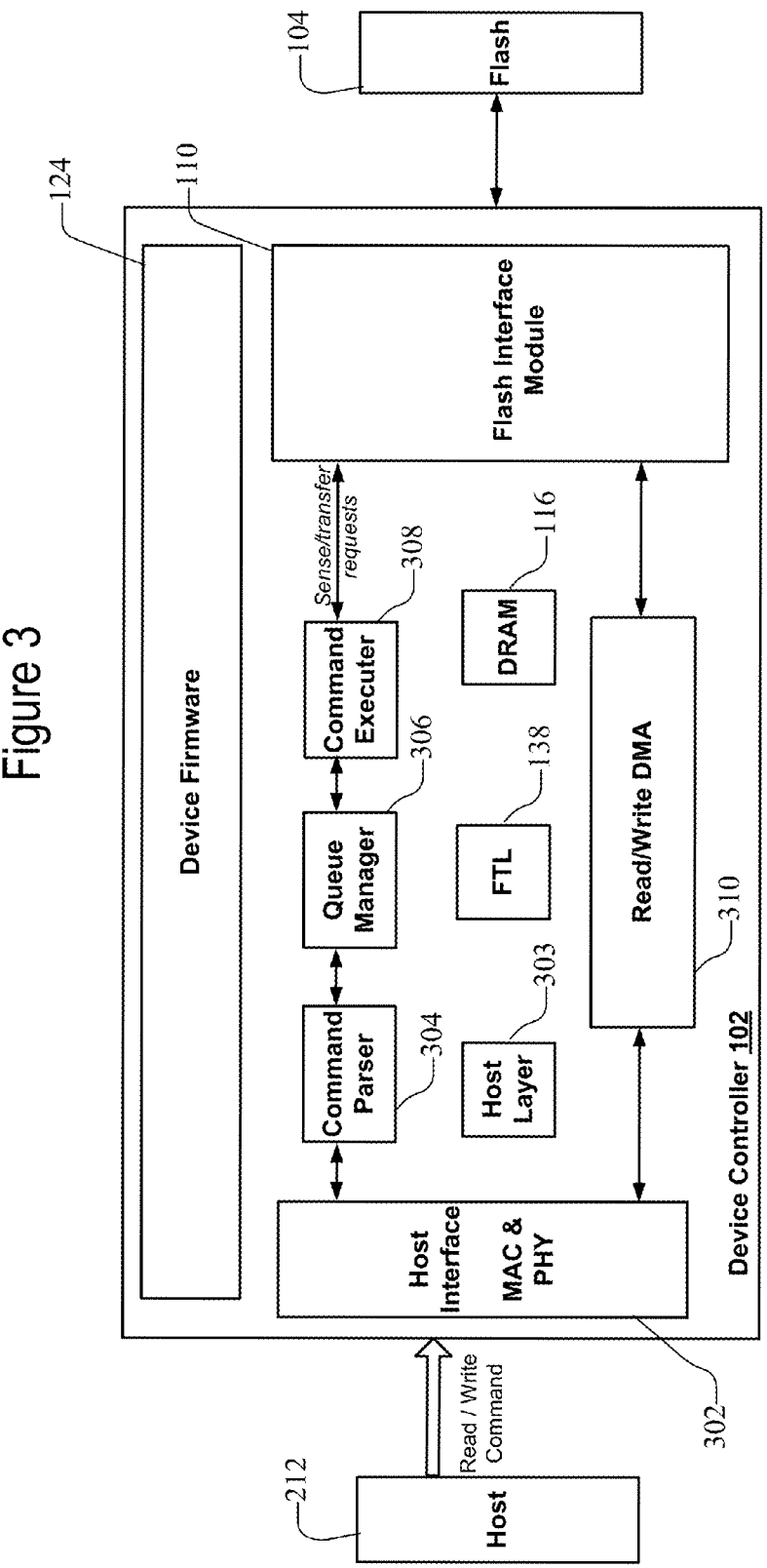
FIG. 3 is a block diagram of a flash device controller.

FIG. 3 may be a portion of FIG. 1 or may illustrate an alternative embodiment. FIG. 3 illustrates an embodiment of the device controller 102, its internal block and their interactions. The host 212 sends commands to the device controller 102 using a physical interface which connects the host to the memory device controller 102. There are many protocols defined in the industry for this interface such as Peripheral Component Interconnect Express (PCIe), SATA and etc. The host interface (MAC and PHY) 302 may implement three low protocol layers (Transaction layer, Data Link layer and Physical layer). The responsibility for the host interface 302 may be to make sure that packets are transferred between the host 212 and the memory device controller 102 without the errors defined in those layers.

The command parser 304 receives the operation as well as the admin host commands, parses them and checks the correctness of the host commands. It may interact with the queue manager 306 in order to queue the commands to the appropriate queue. Before executions, host commands may be pending with the queue manager 306. The queue manager may include an arbitration mechanism for prioritizing commands to be executed by the command executor 308. The FTL 138 may optimize (prioritize and group) the commands in the queue or it be execute throttling by delaying commands or changing other memory parameters unrelated to the command queue. The command parser 304 or the queue manager 306 may be responsible for controlling the flow of data between the controller and the device by ordering requests or commands in the queue. The order may be based on priority of the request, availability of resources to handle the request, an address need for the request, age of the request, type of request (e.g. read or write), or access history of the requestor.

A command queue may be a queue for enabling the delay of command execution (e.g. during throttling), either in order of priority, on a first-in first-out (FIFO) basis, or in any other order. Instead of waiting for each command to be executed before sending the next one, the program just puts the commands in the queue and can perform other processes while the queue is executed. A queue may be used for throttling to control the flow of data between the controller and the device. Commands may be placed in the command queue and ordered by the queue manager 306. The order may be based on priority of the request, availability of resources to handle the request, an address need for the request, age of the request, or access history of the requestor. Although not shown in FIG. 3, command queue may be accessible by the FTL 138 for execution.

The host interface 302 may coupled with a host layer 303 for receiving commands from the host 212. Command executer 308 may be responsible for command selection and execution. Pending commands may be arbitrated by the queue manager 306 to select the next command for execution by sending sense and transfer requests to the flash interface module ("FIM") 110. In one embodiment, the FIM 110 may generate the sense/transfer or program operations to the flash 104. FIM 110 interacts with the flash memory 104 by sending flash commands.

The flash management from the flash transformation layer (FTL) 138 may be responsible for internal memory management operations such as address translation. The FTL 138 may also be referred to as the media management layer (MML). The device controller may include a read/write direct memory access ("DMA") 310 which may be responsible for transferring data between the host and the device. The command parser 304, queue manager 306, flash management 138 and command executer 308 may be responsible for handling the control path in the device, while the read/write DMA 310 handles the data path in the device. Device firmware 124 may control and manage the functionality of this logic. At the initialization phase, the firmware may configure the device controller 102. During operation, the firmware 124 controls the logic and manages the flash memory 104. The firmware 124 may also assist with the command parsing and queue storage and access.

Figure 4:
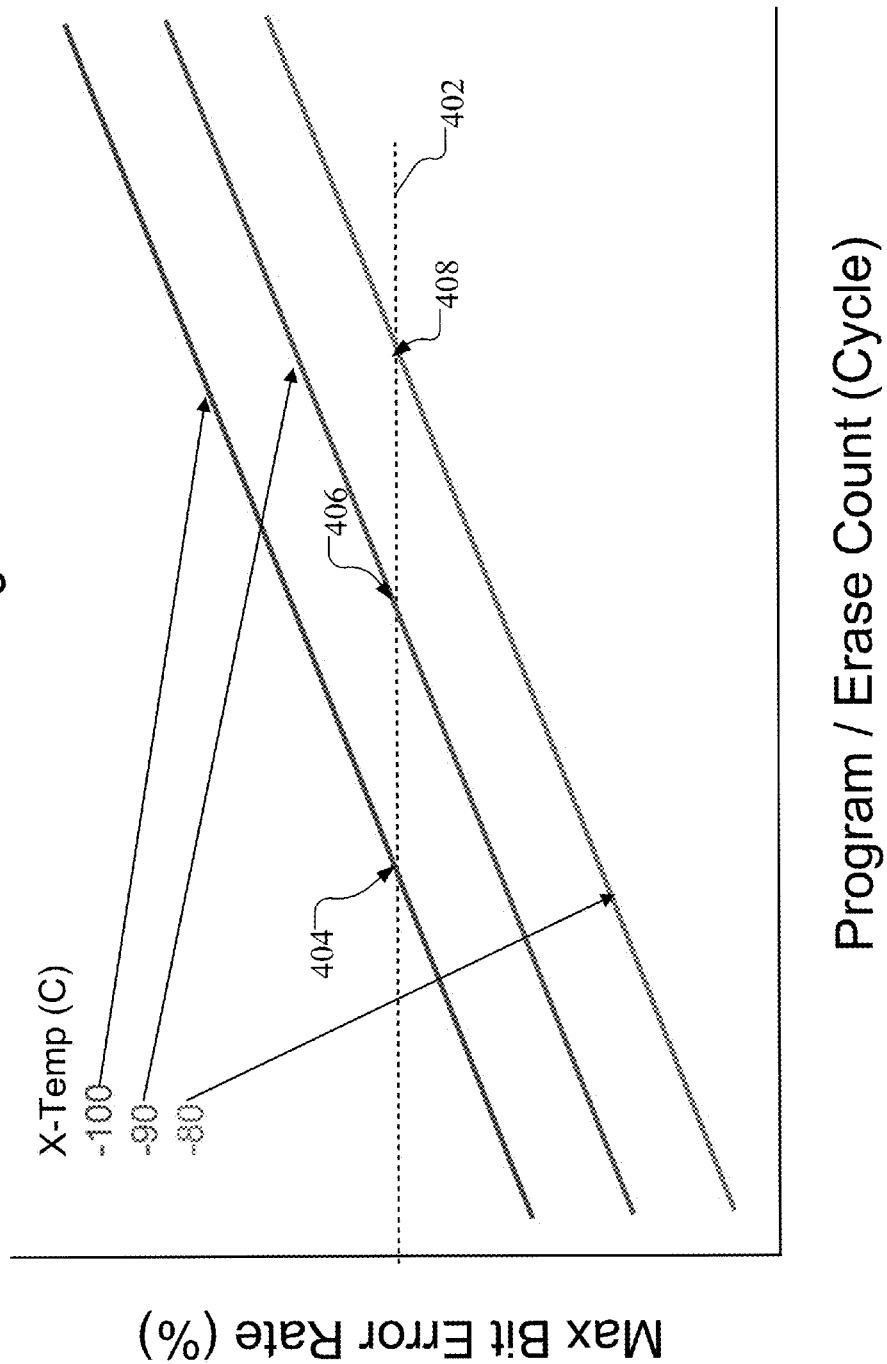
FIG. 4 is a chart that illustrates an exemplary cross temperature (X-temp) situation.

FIG. 4 is a chart that illustrates an exemplary cross temperature (X-temp) situation. The memory device described in FIGS. 1-3 may modify its throttling mechanisms for handling X-temp. FIG. 4 illustrates the effects of X-temp. The x-axis illustrates the hot count or number of program/erase PE cycles. The y-axis illustrates the bit error rate (BER). Generally, as the PE count increases, the BER rate increases. There may be a threshold 402 level of BER which is acceptable or correctable. Depending on the X-temp ("TempX") value, the threshold 402 may be reached at different PE cycle counts. The largest X-temp illustrates an X-temp value of 100. The next X-temp illustrates an X-temp value of 90. The smallest X-temp illustrates an X-temp value of 80.

FIG. 4 shows that the BER rate reaches the threshold 402 quicker (in terms of PE cycles) for the higher temperatures. The highest X-temp of 100 reaches the BER threshold 402 at 404. The middle X-temp of 90 reaches the BER threshold 402 at 406, which is more cycles than for the highest X-temp. Finally, the lowest X-temp of 80 reaches the BER threshold 402 at 408, which is a larger number of cycles than the high and middle X-temps. Accordingly, throttling of the PE cycle count should also depend on the temperature.

FIG. 4 demonstrates that BER is dependent on both PE cycles and temperature. When considering temperature throttling, the timing of temperature throttling should depend on the PE cycles. In particular, the temperature throttling threshold should be set depending on the memory health or memory usage. FIG. 4 illustrates PE cycles as one example of memory usage. For a new block that is less than a number of cycles at 404, the temperature throttling threshold could be set higher (e.g. X-temp of 100). For a block with a higher PE cycle count at 408 the temperature threshold should be lower (e.g. X-temp of 80) because both X-temp of 100 at 404 and X-temp of 90 at 406 have already exceeded the BER threshold 402 when the PE cycle count passes 406.

FIG. 5 is a flow chart for modifying throttling based on memory health/usage and temperature. In block 502, a usage or health value is obtained. As shown in FIG. 4, the hot count (or PE cycles) is one example of the usage. There may be other examples of memory health measurements. In block 504, the device temperature is obtained. The temperature may be measured from a sensor that is part of the memory. In other embodiments, the temperature may be obtained from other sources or estimated. In block 506, both the usage/health value and the temperature value may be compared against criteria. If the criteria are not met, then the process repeats. If the criteria are met, then throttling may be implemented in block 508. In particular, certain parameters may be adjusted based on the usage/health value and the temperature. The criteria may be a usage/health value or test parameter threshold as illustrated in FIG. 6 or may be a temperature threshold as illustrated in FIG. 7.

FIG. 6 is a flow chart for modifying a test mode matrix (TMM) based on temperature. In block 602, the memory usage or memory health value is determined. This memory health value or usage is compared against a threshold in block 604. If the determined memory health or memory usage is worse than the threshold in block 604, then the device temperature is obtained in block 606. The test mode matrix (TMM) is then analyzed in block 608. The TMM is adjusted or modified to be dependent on temperature as shown in Table 1 below:

The TMM may comprise testing parameters. Table 1 illustrates usage as a testing parameter, but memory health, age, or endurance may be other examples of testing parameters. By including temperature dependence in the TMM, the throttling may be optimized and more efficient. The throttling may include adjustments of temperature sensitive parameters such as the throttling parameters in FIG. 8.

FIG. 7 is a flow chart of a temperature throttling threshold that is dependent on memory health/usage. In block 702, the memory device usage is determined. The usage may be the hot count or program/erase (PE) cycles in one embodiment. Based on the PE cycles, there may be a corresponding adaptive throttle temperature in block 704. The adaptive throttle temperature may be referred to as a threshold and is a temperature at which the device begins throttling in an attempt to cool down and avoid errors. Block 706 illustrates an exemplary table of PE cycles with their corresponding throttle temperatures. Block 706 is merely one embodiment and illustrates that as PE cycles increase, the throttle temperature decreases as in Table 2:

TABLE 1

Test Mode Matrix (TMM) dependent on temperature

| | 87+° C. | −70° C.-87° | 50° C.-87° C. | <50° C.-87° C. |
|---|---|---|---|---|
| | Usage (Program/Erase Cycles or Hot Count) | | | |
| Temperatures | Fresh-500 | 501-1K | 1K-1.5K | 1.5K-2K |
| 70-85 C. | Standard (no throttle) | Level 1 throttle | Level 2 throttle | Level 3 throttle |
| 49-69 C. | Standard (no throttle) | Standard (no throttle) | Level 1 throttle | Level 2 throttle |
| 45-48 C. | Standard (no throttle) | Standard (no throttle) | Standard (no throttle) | Level 1 throttle |
| 25-44 C. | Standard (no throttle) | Standard (no throttle) | Standard (no throttle) | Level 1 throttle |
| 10-24 C. | Standard (no throttle) | Standard (no throttle) | Level 1 throttle | Level 2 throttle |
| −2-9 C. | Standard (no throttle) | Level 1 throttle | Level 2 throttle | Level 3 throttle |

Table 1 is merely exemplary of one embodiment of a TMM. Table 1 illustrates that the throttling is dependent on both the usage and temperature. There may be no throttle or different levels of throttling. As shown in Table 1, there may be three levels of throttling. The level 1 throttle is a subtle throttle (small change in performance), while the increase in levels results in increased throttling (larger reductions in performance). For example, level 1 throttle may be a 5-10% reduction in performance, level 2 throttle may be a 10-15% reduction in performance and level 3 throttle may be a 15-25% reduction in performance. Those levels are merely exemplary and there may be more or fewer levels with varying reductions in performance. The TMM illustrates that the usage and the temperature determine when and how much to throttle. The left most column is the temperature bins, which are shown with usage (PE cycles or hot count). The TMM accounts for low temperatures and high temperatures. The throttling levels are determined based on both the usage and the temperatures. Although not shown the throttling at low temperatures may be different than the throttling at high temperatures. Accordingly, each of the three levels may have a low temperature and high temperature version for six throttling levels in this example.

TABLE 2

Adaptive temperature throttling based on usage (e.g. hot count).

| Program/Erase (PE) Cycles | Throttle Temperature |
|---|---|
| <100 | 70° C. |
| <350 | 65° C. |
| <700 | 60° C. |
| <1000 | 55° C. |

Table 2 and block 706 illustrate that a fresher memory (e.g. <100 PE cycles) does not need to throttle until the throttle temperature threshold is high (e.g. 70° C.). An older memory or memory with high usage (e.g. 1000 PE cycles) will throttle at a lower throttle temperature threshold (e.g. 55° C.). In other words, a high throttle temperature threshold can be used for a new memory, but as the usage increases, the throttle temperature threshold should decrease to minimize errors while also optimizing performance (by reducing throttling).

Table 2 and block 706 are used to determine the appropriate throttle temperature threshold in block 708 based on the PE cycles determined in block 702. In block 710, the temperature of the device is determined. In block 712, if the temperature of the device is less than the determined throttle temperature threshold, then the process continues at block 702. However, if the temperature of the device is higher than the determined throttle temperature threshold in block 712, then throttling is implemented in block 714. FIG. 8 illustrates exemplary embodiments of throttling. The process illustrated in FIG. 7 for adaptively adjusting the throttle temperature threshold may optimize performance while still allowing for throttling to control the temperature and reduce errors.

FIG. 8 is a diagram illustrating exemplary throttling parameters. The throttling may include adjustments of any temperature sensitive parameters and may be referred to as NAND parameters when applied to NAND memory. The throttling parameters 802 are features that can be adjusted when in throttle mode. As described, the memory device may be throttled for various reasons (e.g. power usage, temperature, endurance, etc.) and upon throttling, the throttling parameters 802 are exemplary features that may be changed.

The throttling may include adjustments to the programming voltage 804. The programming voltage may be referred to as Vpass. In addition, the programming width or distribution of the voltage may also be adjusted. The voltage distribution may be programmed tighter or narrower. The throttling may also include adjustments to the programming speed 806. Programming speed 806 may also include program timing or other program adjustments (e.g. program pulse width or program step size). Slower programming can be used as part of the throttling.

The throttling may include adjustments to the command handling 808. The commands received at the memory device (e.g. in a queue) may be handled slower during throttle. The queue may be delayed or extra commands may be included during throttling. Command handling 808 may include throttling particular commands or types of commands. The command type throttling may include changing a segmented or continuous command. The may apply to both program and erase commands. For example, segmented commands may include a series of incremental programs that may step toward the voltage to be reached. This may be stepped until the threshold is reached. During throttling, the segment amounts (e.g. voltage increments) may be modified. In throttling, a slightly lower voltage may be applied that moves into a program status more slowly. Command handling 808 may include command verification adjusting. For a continuous program, the NAND may be setting the segments and checks and see whether it is programmed. This may include changing internal settings to do more verifications or to do softer programs/erases. A change in internal steps so that they are programming more slowly may include different verification.

Command settings may be another example of command handling 808. The speed or safety margins of the memory may be modified. The NAND die use internal circuitry to apply steps and incrementally move the non-volatile state between erased or different bit values. This may be for both erases and programs. The steps to make these state movements may be modified such as by making the steps more numerous, with different durations, different deltas in voltage level applied, different slew rates and settling times, different de-selection voltages on peripheral cells, different ordering of procedures, etc. Any or all of these items may change. Some of them are found to correlate to performance, cell life degradation, endurance, power consumption, Bit Error Rate (BER) on future read, read disturb robustness, data retention at various temperatures, etc. Using the knowledge of throttling type and the characterization work on the above, we can dial in one behavior for standard flow. A different behavior for a power throttled flow. A different behavior setting for temperature throttled flow. A different behavior for performance throttling.

The die parameter 810 may include a number of parameters related to the NAND die. For example, the clock rate may be reduced in throttle mode. In particular, the clock rate can be slowed down. Circuitry usage may reduce because whenever the device is turned on, it may be using power. The slower the clock rate then the less that power will be. It may never disappear but a lower clock rate can decrease idle power. This is a savings on both thermal power that you have to dissipate and also it may be a savings if there is a power cap, such as if there is a total usage limit on the memory device. In other words, the device clock rate reduction may be effective both at idle when the NAND memory is not even be utilized and also when a command is actually being used. Since the commands slow down, this reduces the power consumed which results in a lower temperature generated by the activity in the NAND. In another embodiment, the die parameter 810 may include turning off SRAM buffers as another throttling mechanism. Alternatively, the operating voltage of the die may be changed as part of the throttling. The operating supply voltage may be set at the PCB level. Lowering the voltage may lower the power during throttle. As a result, more verification or more segments may be performed because there is a reduced ability for the die to draw power.

The flash communication bus parameters 812 may be another example(s) of throttling parameter(s) 802 that are adjusted for throttling. In one embodiment, the communication bus parameters 812 may include different rates or bus speed for data and commands. The flash bus may include a communication pathway between the flash interface module and the flash. There may be a clock rate associated with it and this can be a power savings within the SSD. It may be a one-time change that determines that flash bus speed is reduced such that communication is slower. In an alternative embodiment, there may not be a one-time global setting for the throttling (such that the throttling parameter is changed during throttling). There may be a throttling that is on a command basis rather than a global setting. The throttling may be for a certain time period and/or specific to a particular channel and/or a particular die that is specifically throttled. Flash bus data transfer size may be another flash communication bus parameter 812 that is adjusted for throttling. Small data transfers mean the die is busy transferring more data packets to the controller. This burns more time and delays future activity for that NAND die.

Rather than limiting commands, functional pieces of the controller may be shut down. Since major thermal and power demands are in the NAND memory, the shutting down of hardware in the controller may be an indirect method for reducing NAND activity. However, not all controllers have refined power off capabilities on all hardware pieces. Drive performance may be reduced depending on the impact of the hardware shut off. Consequently, if that particular piece of hardware is not a bottleneck in the current drive workload (that does not hurt drive performance), then there may be no effective throttling of NAND memory activity.

In one embodiment, implementation of the throttling may include the FTL changing the flash interface module's sequence of events that it will run in order to execute a program or a read. This may be a one-time global setting so that the FTL can make a one-time command and it will send the command down to the flash interface module. The flash interface module may distribute it to the flash and request a change in a NAND parameter (e.g. lower NAND clock rate). It may be used for lower power states or powering down peripheral non-essential circuitry in NAND such as higher powered memory buffers. This may be a trim setting (i.e. a setting within each of the dies). It may be queued such that the flash runs slower when we are not throttled. It may send a new command regarding the clock rates. In an alternative embodiment, the throttling may be specific to a channel, or die such that only part of the NAND is throttled.

Figure 9:
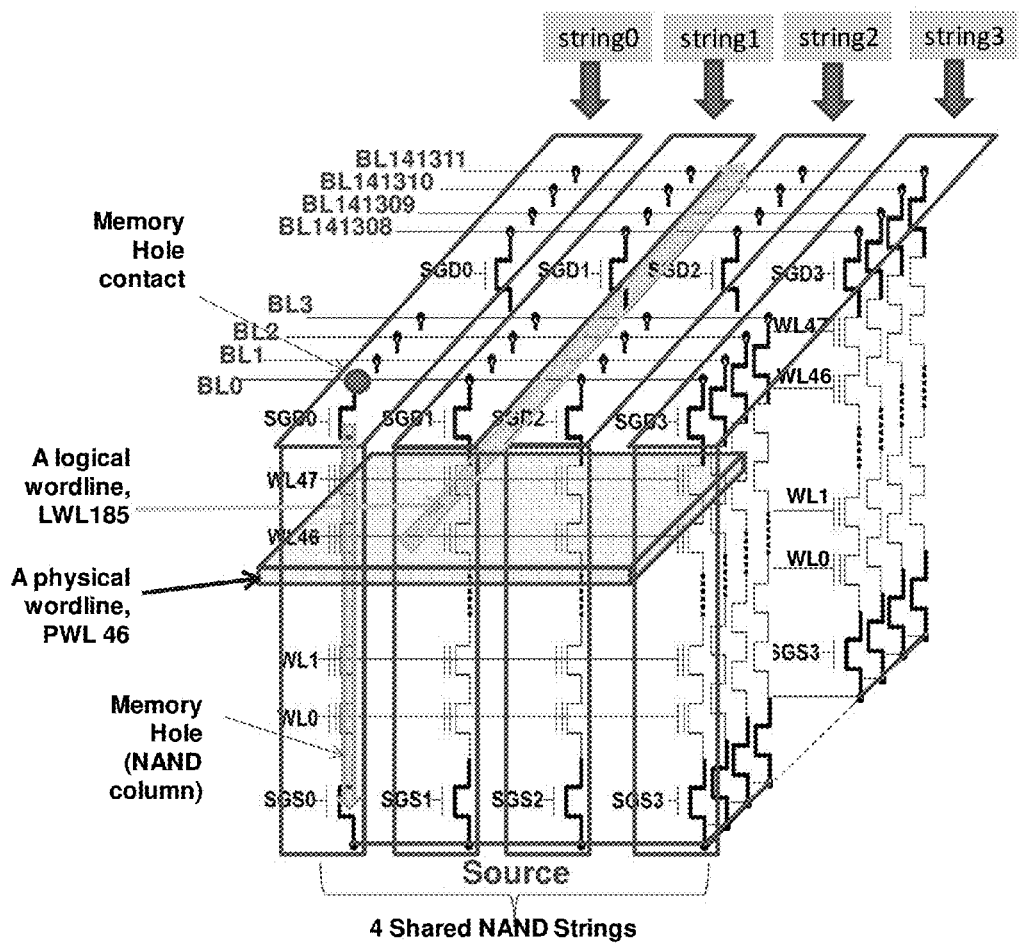
FIG. 9 is an illustration of an exemplary three-dimensional (3D) memory structure.

FIG. 9 is an illustration of an exemplary three-dimensional (3D) memory structure. The throttling and temperature dependent changes describe herein may be utilized in different types of memory, such as charge trapping (CT) memory, or in the 3D memory illustrated in FIG. 9. FIG. 9 is an illustration of an exemplary three-dimensional (3D) memory structure. FIG. 9 illustrates an exemplary 3D NAND flash with Bit Cost Scaling (BiCS). The source lines and bit lines are further described an illustrated with respect to FIG. 10. The flash memory used in the storage system may be flash memory of 3D NAND architecture, where the programming is achieved through Fowler-Nordheim of the electron into the charge trapping layer (CTL). Erase may be achieved by using a hole injection into the CTL to neutralize the electrons, via physical mechanism such as gate induced drain leakage (GIDL). FIG. 9 is an exemplary 3D structure with each cell being represented by a memory transistor forming a memory column vertically (e.g., 48 wordlines). The wordlines (WL), bitlines (BL), and string number are shown in FIG. 9. Four exemplary strings are shown. There may be a memory hole (within a NAND column) that includes a memory hole contact. One exemplary wordline (logical wordline LWL 185) is illustrated along with an exemplary physical wordline (PWL 46). Although relevant for 3D memory applications, the adaptive temperature throttling and TMM temperature dependence may be relevant to other structures, including 2D flash memory with charge trapping dielectric and tunneling dielectric. In particular, a charge trapping dielectric memory may be 3D or 2D.

Figure 10:
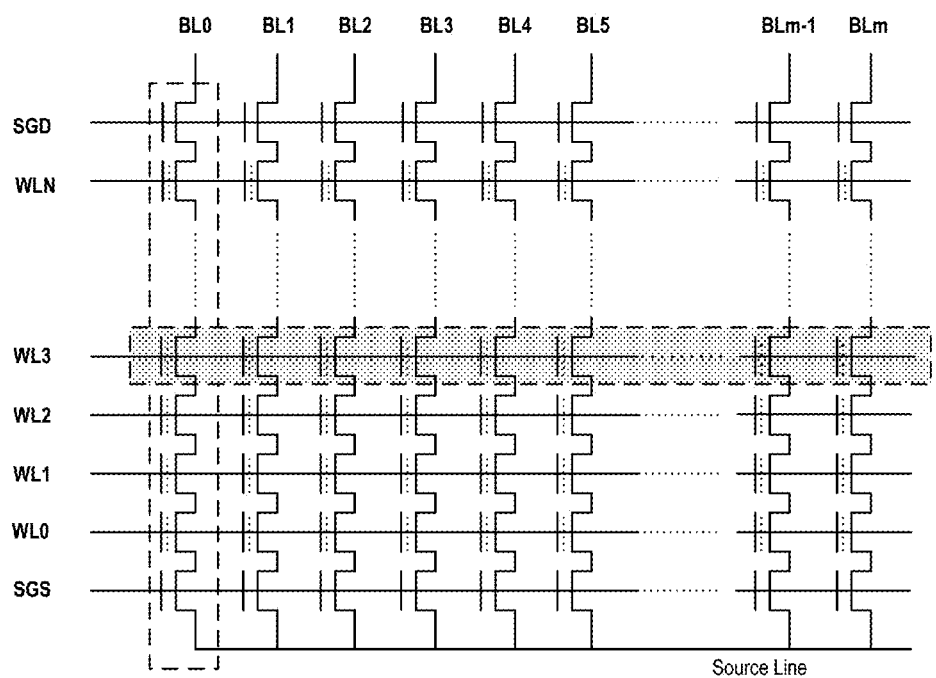
FIG. 10 is an exemplary physical memory organization of a memory block.

FIG. 10 is an exemplary physical memory organization of a memory block. FIG. 10 illustrates a page of memory cells, organized for example in the NAND configuration, being sensed or programmed in parallel. In one embodiment, FIG. 10 illustrates one of the strings of a 3D NAND architecture, where each wordline may span across multiple strings (either in front of or behind the string in FIG. 10). A bank of NAND chains are shown in the exemplary memory. A page may be any group of memory cells enabled to be sensed or programmed in parallel. The page is enabled by the control gates of the cells of the page connected in common to a wordline and each cell accessible by a sensing circuit accessible via a bit line (bit lines BL0-BLm). As an example, when respectively sensing or programming the page of cells, a sensing voltage or a programming voltage is respectively applied to a common word line (e.g. WL2) together with appropriate voltages on the bit lines. A select gate drain (SGD) is shown opposite from a decoding gate, such as select gate source (SGS). SGS may also be referred to as the source gate or source, while SGD may be referred to as the drain gate or drain. Directly adjacent to the source/drain gates may be dummy wordlines that act as buffers to separate the source/drain gates from the normal wordlines and to protect the normal wordlines from potential defects.

The memory structure may utilize charge trapping (CT) or a floating gate structure. In one embodiment, the charge trapping layer may be a dielectric, such as silicon nitride, magnesium oxide, or another insulator that is porous enough for electrons to be trapped in the pores. The silicon nitride may be a film that stores electrons. CT may use a SONGS (semiconductor-oxide-nitride-oxide-semiconductor) or MONOS (metal-oxide-nitride-oxide-semiconductor) capacitor structure, storing the information in charge traps in the dielectric layer. CT may be used for either non-volatile NOR or NAND flash memory. There may be a variable charge between a control gate and a channel to change a threshold voltage of a transistor. The CT layer may be an insulator, which provides improved endurance. The programming of the CT layer may include electron movement onto the CT layer with channel hot electron injection (HEI) or hot-carrier injection in which a high voltage is between the control gate with a medium voltage at the source and the drain, and a current is induced from the source to the drain. In another embodiment, Fowler Nordheim tunneling (FNT) may be an alternative when there is a high voltage on the control gate and a low voltage on the memory transistor's channel. Electrons are injected or tunneled into the CT layer by the biasing conditions. Hot hole injection may be utilized for removing a charge from the CT layer. In other words, adding holes (or positive charge because of a lack of electrons) may be used to erase.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM, PCM, or STT-MRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents that are intended to define the scope of the claimed invention. Finally, it should be noted that any aspect of any of the preferred embodiments described herein can be used alone or in combination with one another.

We claim:

1. A method for temperature throttling in a memory device, the method comprising:
    determining a health value of the memory device;
    modifying a plurality of temperature throttling thresholds based on the health value of the memory device, wherein each of the temperature throttling thresholds comprises a temperature above which the memory device is throttled differently; and
    throttling the memory device when a temperature of the memory device exceeds each of the temperature throttling thresholds, wherein the throttling comprises reducing a performance of the memory device by modifying a programming speed or programming voltage, further wherein each of the temperature throttling thresholds are associated with a different modification of the programming speed or programming value.

2. The method of claim 1 wherein the temperature is measured from a temperature sensor in the memory device.

3. The method of claim 1 wherein the health value is determined based on a usage of the memory device, further wherein the usage comprises a number of program/erase (PE) cycles.

4. The method of claim 3 wherein at least some of the temperature throttling thresholds are increased when the PE cycles is low and gradually decreased as the PE cycles increases.

5. The method of claim 1, wherein the plurality of temperature throttling thresholds comprise different levels of throttling such that as a temperature exceeds higher temperature throttling thresholds, the throttling of the performance is increased.

6. The method of claim 5, wherein a reduction in performance is increased corresponding to increased temperatures for each of the temperature throttling thresholds.

7. The method of claim 1 wherein the reducing of the performance further comprises delaying command execution, and modifying command handling.

8. The method of claim 1 wherein the memory device comprises NAND memory and the throttling comprises throttling memory device parameters that include at least one of a clock rate, a flash bus speed, a communication methodology, a command type, a command settings, a command verification, speed margins, or operating voltage.

9. A memory device comprising:
    a temperature sensor configured to measure a temperature of the memory device;
    a test mode matrix with a plurality of testing parameters for the memory device that are dependent on the temperature, wherein the testing parameters comprise at least programming settings; and
    throttling circuitry configured to throttle the memory device based on the temperature to reduce a cross temperature, wherein the cross temperature comprises a difference in temperature when writing data and temperature when reading data.

10. The memory device of claim 9 wherein the programming settings comprise a programming speed and a programming voltage, further wherein the testing parameters further comprise command handling, and command execution timing.

11. The memory device of claim 9 wherein the throttling circuitry throttles differently depending on the temperature.

12. The memory device of claim 9 wherein the throttling reduces the difference in temperature between writing and reading data.

13. The memory device of claim 9 wherein the throttle circuitry is configured to reduce power usage, reduce a temperature of the memory device, alter performance to match production drive variability, or improve endurance of the memory device.

14. The memory device of claim 9 wherein the memory device comprises a three-dimensional (3D) memory configuration, and wherein a controller is associated with operation of and storing to the flash memory.

* * * * *